Patented Apr. 11, 1933

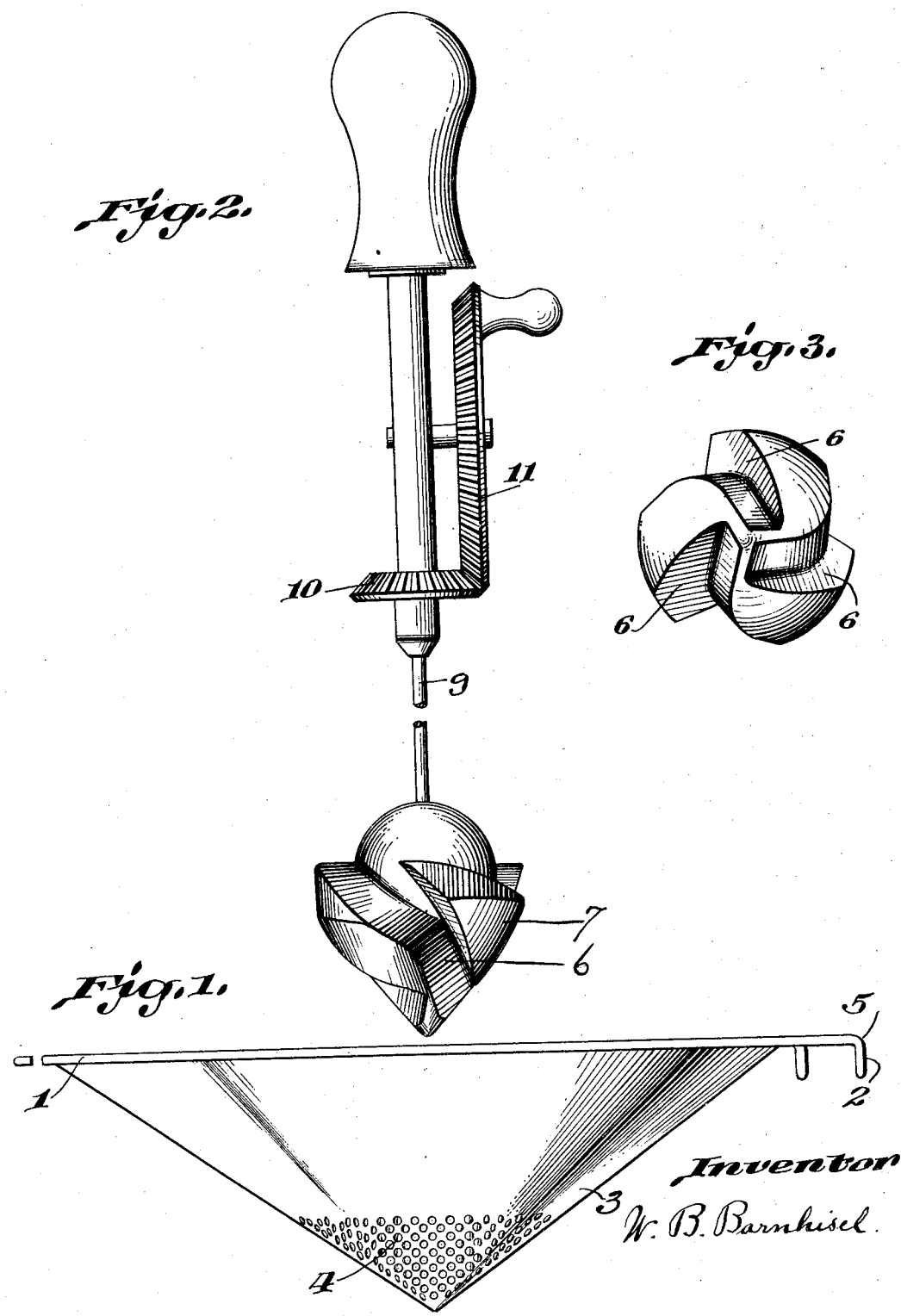

1,903,527

UNITED STATES PATENT OFFICE

WALTER B. BARNHISEL, OF LOS ANGELES, CALIFORNIA

STRAINING AND PULP MAKING MACHINE

Application filed May 21, 1928. Serial No. 279,526.

My invention relates to food strainers and pulp making machines. For the purpose of describing my machine and to classify it, straining and pulping machines fall into three classes, first, the grinding and chopping machines, second, the "ricers", depending on a lever to force food through a strainer, third, strainers with a member to operate inside the strainer and which are an improvement on a spoon, a pestle or the hand to work materials through the strainer. It is relative to this third type that this invention relates. I believe, through the use of the machine herein described, through inquiry, from advice from others who have used it, that it is new as to construction, operation and results obtained by its use. The objects and advantages of my invention are to accomplish more thoroughly and in a simpler, quicker and easier way, for the whole task, the straining of food materials and the making of pulp, together with a material saving of food. The herein described machine may be used with advantage in straining materials to which it is adapted, other than food materials.

I attain the objects of this invention by the mechanism illustrated in the accompanying drawing in which:

Figure 1 represents a receptacle and strainer combined, with strainer area 4 at the bottom of receptacle consisting of a relatively small part of the area of the whole. Figure 2 shows an operating member 7 attached to geared wheels for operation. Figure 3 represents the bottom or inverted view of member 7. Similar numerals refer to similar parts in the several views.

By means of handle 1 and hooks 2 the receptacle and strainer rests over a basin. Sides 3 of receptacle and strainer may be any of several angles to the plane of top 5. Likewise sides of the conical stirring member 7, in a line pointing downward, may be any of several angles to the plane 8 of the top of member 7. The conical stirring member 7 has a plurality of spiral grooves 6 in the face thereof which terminate at their lower end at substantially right angles to each other adjacent the apex of the conical stirring member 7. Each of said grooves has a surface facing downwardly and outwardly whereby the conical stirring member cooperates with the conical strainer receptacle to force the material downwardly and outwardly through the apertures in the conical strainer. The shaft 9 firmly connects the conical stirring member 7 with the lesser gear 10 and master gear 11 operates to accelerate the conical stirring member 7.

I claim:

1. The combination in a straining and pulp making machine comprising a conical strainer receptacle having the apex portion only perforated and a positively rotated conical pressing and stirring member, unconnected with the receptacle, said conical stirring member having a plurality of spiral grooves in the face thereof so constructed and arranged as to terminate at the lower end at right angles to each other adjacent the apex of the conical member and each groove having a surface facing downwardly and outwardly whereby the material in the receptacle is forced downwardly and outwardly through the strainer apertures.

2. The combination in a straining and pulp making machine comprising a conical strainer receptacle having the apex portion only perforated and a positively rotated conical pressing and stirring member, unconnected with the receptacle, said conical stirring member having a plurality of spiral grooves in the face thereof which terminate at their lower end at right angles to each other adjacent the apex of the conical member and each groove having a surface facing downwardly and outwardly whereby the material in the receptacle is forced downwardly and outwardly through the strainer apertures.

In testimony whereof, I affix my signature.

W. B. BARNHISEL.